US008654254B2

(12) United States Patent
Kim et al.

(10) Patent No.: US 8,654,254 B2
(45) Date of Patent: Feb. 18, 2014

(54) DEVICE AND METHOD FOR DRIVING DISPLAY PANEL USING TIME VARIANT SIGNAL

(75) Inventors: Beom-Jin Kim, Cheongju-si (KR); Hee-Jung Kim, Cheongju-si (KR); Dae-Ho Lim, Cheongju-si (KR); Ki-Seok Cho, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 726 days.

(21) Appl. No.: 12/862,209

(22) Filed: Aug. 24, 2010

(65) Prior Publication Data

US 2011/0069232 A1 Mar. 24, 2011

(30) Foreign Application Priority Data

Sep. 18, 2009 (KR) ........................ 10-2009-0088640
Oct. 23, 2009 (KR) ........................ 10-2009-0101398

(51) Int. Cl.
*H04N 5/14* (2006.01)
*G09G 5/10* (2006.01)

(52) U.S. Cl.
USPC ............... 348/571; 345/89; 345/212; 345/98; 345/99; 345/100; 348/E5.062; 348/E7.003; 370/329; 370/338; 375/343

(58) Field of Classification Search
USPC .................... 341/140–155; 348/571, E5.062; 327/94; 257/57; 375/343; 370/329, 370/338; 345/212, 211, 204, 89, 98, 213, 345/92, 87, 94, 99
See application file for complete search history.

(56) References Cited

U.S. PATENT DOCUMENTS 5,440,256 A 8/1995 Erhart et al.
6,489,943 B1 * 12/2002 Yeo ................................ 345/99
6,535,192 B1 * 3/2003 Sung et al. ...................... 345/94
7,133,011 B2 * 11/2006 Ha ................................. 345/87
7,382,344 B2 * 6/2008 Lee et al. ........................ 345/99
7,436,384 B2 * 10/2008 An ................................. 345/98
7,643,002 B2 * 1/2010 Kang et al. .................... 345/100
8,031,156 B2 * 10/2011 Jang et al. ...................... 345/98
8,102,354 B2 * 1/2012 Jung ............................. 345/100
8,310,426 B2 * 11/2012 Umeda ........................... 345/89
8,319,803 B2 * 11/2012 Woo et al. ..................... 345/690

FOREIGN PATENT DOCUMENTS

KR 10-2001-0018731 A 3/2001
KR 10-0727410 6/2007

OTHER PUBLICATIONS

Korean Office Action, issued in Korean Patent Application No. 10-2009-0101398, dated Feb. 15, 2011 (8 pages).
English language abstract of KR 10-0727410, published Jun. 5, 2007.

* cited by examiner

*Primary Examiner* — Lam T Mai
(74) *Attorney, Agent, or Firm* — NSIP Law

(57) ABSTRACT

An apparatus for driving a display panel includes: a time variant signal (TVS) generator configured to generate a time variant signal group; a common pulse signal generator configured to generate a plurality of pulse signals; a selector configured to receive the time variant signal, the plurality of the pulse signals, and video data and select a grayscale voltage corresponding to the video data; and a buffer configured to buffer and transfer an output of the selector. Herein, the selector and the buffer are provided to each of a plurality of channels, and the time variant signal and the plurality of the pulse signals are inputted in common to the selector of each channel.

28 Claims, 15 Drawing Sheets

DEVICE AND METHOD FOR DRIVING DISPLAY PANEL USING TIME VARIANT SIGNAL

CROSS-REFERENCES TO RELATED APPLICATIONS

The present application claims priority of Korean Patent Application Nos. 10-2009-0088640 and 10-2009-0101398, filed on Sep. 18, 2009, and Oct. 23, 2009, respectively, which are incorporated herein by reference in their entirety.

TECHNICAL FIELD

Exemplary embodiments of the present invention relates to a circuit and method for driving a flat display panel; and, more particularly, to an efficient structure of a data driver for applying image data to a display panel in the form of voltage or current. The data driver may be called a column line driver or a source driver.

BACKGROUND OF RELATED ART

A data driver of a flat display panel converts digital video data into analog video data and transfers the analog video data to a display panel. A digital-to-analog converter (DAC) occupies a large area of the entire structure of the data driver, and there have been diverse attempts to reduce the area of the digital-to-analog converter. Among them is a lamp-type digital-to-analog converter using time variant signals (TVS), which is regarded as an alternative.

A lamp-type digital-to-analog converter is driven by receiving a time variant signal representing a plurality of grayscale voltages and selects and outputs a particular grayscale voltage.

FIG. 1A is a block diagram snowing major parts of a conventional driver using a single time variant signal. A driver using a single time variant signal is disclosed in U.S. Pat. No. 5,440,256, entitled "Dual Mode Track and Hold Drivers for Active LCD's."

Referring to FIG. 1, the driver using a single time variant signal includes a single TVS generator 110, an N-bit switch 120, an N-bit pulse signal generator 130, and a channel buffer 140. The single TVS generator 110 generates a single time variant signal sequentially representing all grayscale voltages at every period of one line time. The N-bit switch 120 receives the single time variant signal and performs switching onto the single time variant signal to select a grayscale voltage corresponding to video data. The N-bit pulse signal generator 130 controls the N-bit switch 120. The channel buffer 140 outputs an output of the N-bit switch 120 through a source line.

The N-bit switch 120, the N-bit pulse signal generator 130 and the channel buffer 140 are some of the constituent elements of a channel block of the driver, and they are provided to every channel block constituting the driver. The single TVS generator 110 is shared by all channels.

FIG. 1B illustrates an operation of the driver using a single time variant signal. The single TVS generator 110 is synchronized with a clock signal and generates a time variant signal 160 sequentially representing $2^N$ grayscale voltages for a one line time. The time variant signal 160 is inputted to the N-bit switch 120 of each channel. The N-bit pulse signal generator 130 generates an N-bit pulse signal 170. The N-bit switch 120 selects a particular grayscale voltage among the grayscale voltages of the time variant signal 160 by being turned on/off according to one pulse signal among $2^N$ pulse signals. A grayscale voltage signal 180 selected by the N-bit switch 120 is transferred to a source line of the display panel through the channel buffer 140.

Since the digital-to-analog converter using a single time variant signal sequentially represents $2^N$ grayscale voltages for one line time, the digital-to-analog converter is short of time for charging a panel load. Thus, there is an error between the voltages of pixels. Moreover, much power is consumed when the pulse signal generators of all channels operate in synchronization with a clock signal. Also, since a switch and an N-bit pulse signal generator are added to each channel, a channel area is increased. These problems become morn serious as a display device has high grayscale, high definition and large size.

FIG. 2A is a block diagram showing major parts of a conventional driver using a plurality of time variant signals. A driver using the plurality of time variant signals is disclosed in Korean Patent No. 727,410, entitled "Digital-to-Analog Converting Circuit and Method for Driving a Flat Display Panel Using Multi-Ramp Signals."

A driver using the plurality of time variant signals is suggested to resolve the above-mentioned problems. The driver includes a multiple TVS generator 210, an M-bit switch 220, an (N-M)-bit pulse signal generator 230, and a channel buffer 240.

The multiple TVS generator 210 divides a region of all grayscale voltages into ($\frac{1}{2}^M$) grayscale voltage regions for every period of one rue time and generates a plurality of ($2^M$) time variant signals. The M-bit switch 220 receives the plurality of the time variant signals and performs switching onto the plurality of the time variant signals to select a grayscale voltage, corresponding to video data. The channel buffer 240 outputs an output of the M-bit switch 220 to a source line of the display panel. Herein, N and M are positive integers and N is greater than M (N>M).

The M-bit switch 220, the (N-M)-bit pulse signal generator 230, and the channel buffer 240 are some of the constituent elements of a channel block of the driver and they are provided to every channel constituting the driver. The multiple TVS generator 210 is shared by the channels.

FIG. 2B illustrates an operation of the driver using the plurality of time variant signals.

The multiple TVS generator 210 generates a plurality of time variant signals 260. Since the plurality ($2^M$) of the time variant signals 260 represent all grayscale voltages by regions, each time variant signal 260 sequentially represents $2^{N-M}$ grayscale voltages for a period of one line time.

The plurality ($2^M$) of the time variant signals 260 are inputted to the M-bit switch 220 of each channel. The (N-M)-bit pulse signal generator 230 generates $2^{N-M}$ pulse signals 270. The M-bit switch 220 selects a particular grayscale voltage among the grayscale voltages of the time variant signals by being turned on/off according to one of the pulse signals among the $2^{N-M}$ pulse signals 270. A grayscale voltage signal 280 selected by the M-bit switch 220 is transferred to a source line of the display panel through the channel buffer 240.

When a plurality of time variant signals are used, the display panel charge time is increased as much as $2^M$. Thus, it is possible to reduce an error between pixel voltages. Also, since a clock frequency that is $2^M$ times as slow is used, power consumption may be reduced. In addition, since a circuit of the (N-M)-bit pulse signal generator 230 is reduced into (N-M) bits, a channel area is reduced as well.

However, each channel includes a counter which is formed of a plurality of flip-flops and the (N-M)-bit pulse signal generator 230 which is formed of multiple logic circuits, the digital-to-analog converter still occupies a large area. Moreover, a great deal of power is still consumed when the (N-M)-bit pulse signal generators of all channels operate in synchronization with a clock signal.

SUMMARY OF DISCLOSURE

An embodiment of the present invention is directed to an apparatus and a method for driving a display panel with remarkably reduced dimensions.

Another embodiment of the present invention is directed to an apparatus and a method for driving a display panel with low power consumption.

Another embodiment of the present invention is directed to an apparatus and a method for driving a display panel whose video quality is easily improved.

Other objects and advantages of the present invention can be understood by following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for driving a display panel includes: a time variant signal (TVS) generator configured to generate a time variant signal group; a common pulse signal generator configured to generate a plurality of pulse signals; a selector configured to receive the time variant signal, the plurality of the pulse signals, and video data and select a grayscale voltage corresponding to the video data; and a buffer configured to buffer and transfer an output of the selector. Herein, the selector and the buffer are provided to each of a plurality of channels, and the time variant signal and the plurality of the pulse signals are inputted in common to the selector.

The TVS generator may divide a range of all grayscale voltages into a plurality of grayscale voltage ranges and generate the time variant signal group having a plurality of time variant signals each corresponding to each grayscale voltage range. The TVS generator may generate the time variant signal group having a single time variant signal sequentially representing a range of all grayscale voltages.

The common pulse signal generator may include a register configured to control an on/off duty ratio of each pulse signal.

In accordance with another embodiment of the present invention, an apparatus for driving, a display panel includes: a TVS generator configured to generate a plurality of time variant signals; a common pulse signal generator configured to generate a plurality pulse signals; a sampler configured to sample and output video data; a pulse selector configured to select any one among the plurality of the pulse signals based on a lower-bit data among the sampled video data; and a TVS selector configured to select any one among the plurality of the time variant signals based on an upper-bit data among the sampled video data, switch the selected lime variant signal in an enable duration of the selected pulse signal, and transfer the switched time variant signal.

In accordance with yet another embodiment of the present invention, an apparatus for driving a display panel includes: a TVS generator configured to generate a single time variant signal; a common pulse signal generator configured to generate a plurality of pulse signals; a sampler configured to sample and output video data; a pulse selector configured to select any one among the plurality of the pulse signals based on the sampled video data; and a switch configured to switch the time valiant signal in an enable duration of the selected pulse signal and transfer the switched time variant signal.

In accordance with still another embodiment of the present invention, a digital-to-analog converting method includes: selecting any one among a plurality of pulse signals based on a lower-bit data among sampled video data; selecting any one among a plurality of time variant signals based on an upper-bit data among the sampled video data; and switching the selected time variant signal in an enable duration of the selected pulse signal and transferring the switched time variant signal.

In accordance with still yet another embodiment of the present invention, a digital-to-analog converting method includes: selecting any one among a plurality of pulse signals based on sampled video data; and switching a single time variant signal in an enable duration of the selected pulse signal and transferring the switched time variant signal to a channel buffer.

DETAILED DESCRIPTION OF SEVERAL EMBODIMENTS

Figure 1A:
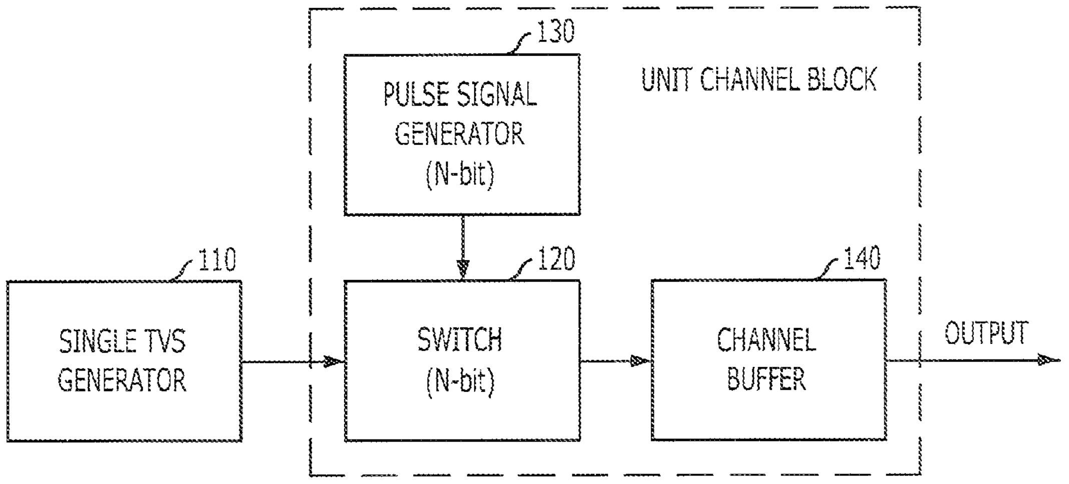
FIG. 1A (PRIOR ART)
FIG. 1A is a block diagram showing major parts of a conventional driver us time variant signal.
Figure 1B:
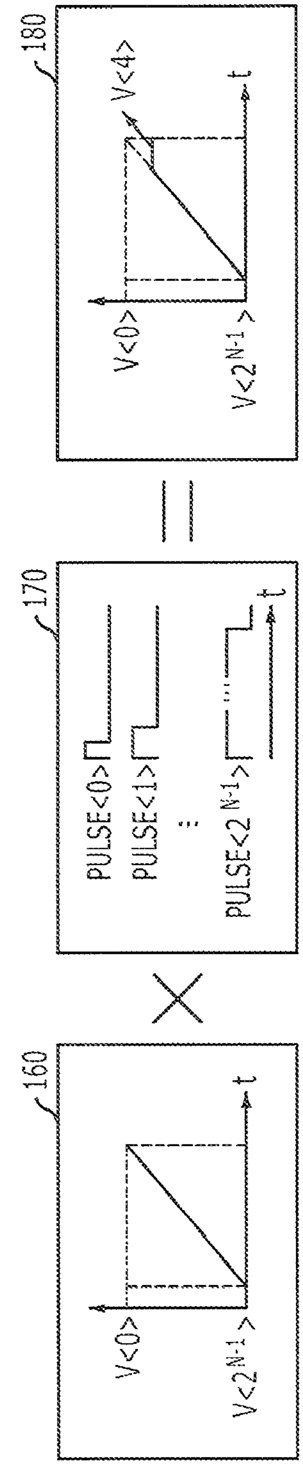
FIG. 1B (PRIOR ART)
FIG. 1B illustrates an operation of the driver using a single time variant signal.
Figure 2A:
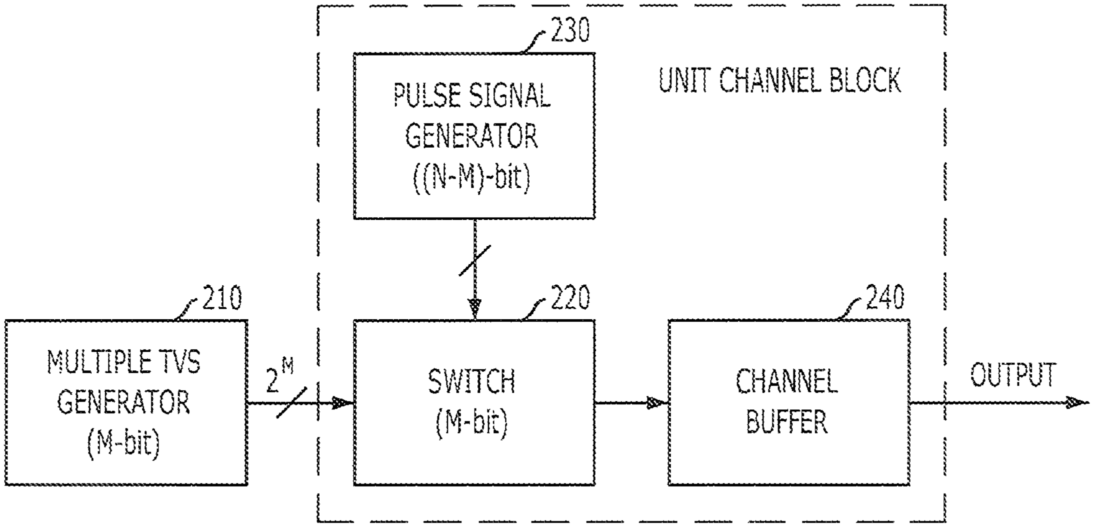
FIG. 2A (PRIOR ART)
FIG. 2A is a block diagram showing major parts of a conventional driver using a plurality of time variant signal.
Figure 2B:
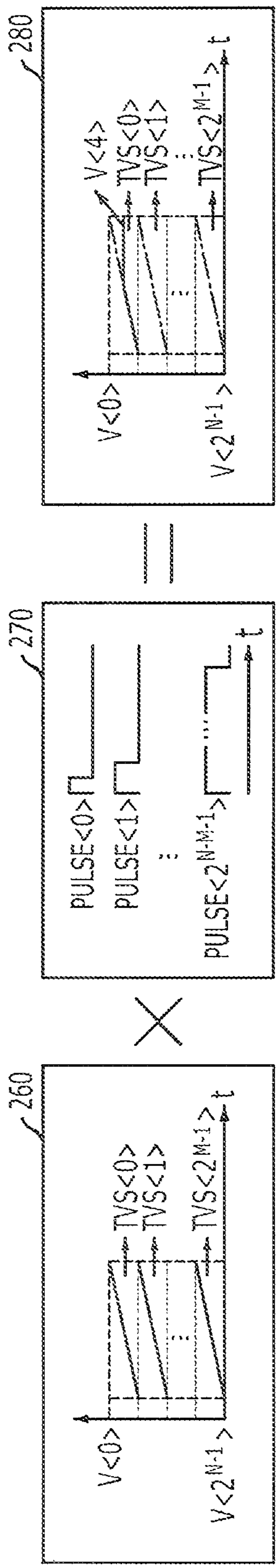
FIG. 2B (PRIOR ART)
FIG. 2B illustrates an operation or the driver using the plurality of time variant signals.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

Hereinafter, the embodiments of the present invention described in this specification, the technology of the present invention is applied to a liquid crystal display (LCD) to reduce the area of the liquid crystal display and power consumption. However, the technology of the present invention may be applied to all drivers for flat display devices, such as a field emission display (FED), electro-luminescent display (ELD), a plasma display panel (PDP) and the like.

First Embodiment

Figure 3:
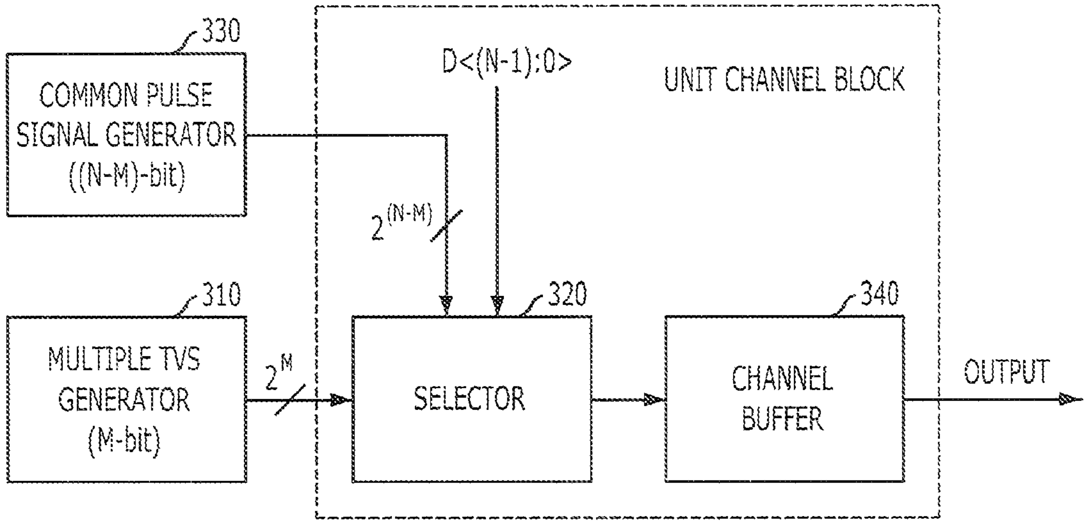
FIG. 3 is a block diagram illustrating a driver of a display panel using a multiple time variant signal (TVS) generator and a common pulse signal generator in accordance with a first embodiment of the present invention.

FIG. 3 is a block diagram illustrating a driver of a display panel which uses a multiple time variant signal (TVS) generator and a common pulse signal generator in accordance with a first embodiment of the present invention.

Referring to FIG. 3, the driver includes a multiple time variant signal (TVS) generator 310 configured to generate a plurality ($2^M$) of time variant signals and a common pulse signal generator 330 configured to generate a plurality ($2^{N-M}$) of pulse signals having different pulse widths. Also, the driver includes a selector 320 and a channel buffer 340. The selector 320 receives the plurality ($2^M$) of the time variant signals, the plurality ($2^{N-M}$) of the pulse signals, and video data D<(N−1):0> to select a grayscale voltage corresponding to the video data. The channel buffer 340 outputs an output of the selector 320 to a source line of the display panel. Herein, N and M are positive integers and N is greater than M (N>M). A region of all grayscale voltages are divided into $\frac{1}{2}^M$ grayscale voltage regions for every period of one line time, and each of the plurality ($2^M$) of the time variant signals is generated corresponding to each grayscale voltage range.

The selector 320 and the channel buffer 340 are constituent elements of a unit channel block and they are provided to every channel that constitutes the driver. The multiple TVS generator 310 and the common pulse signal generator 330 are shared by all channels. In other words, the plurality of the time variant signals and the plurality of the pulse signals are inputted in common to the selector 320 of each channel.

As illustrated in FIG. 3, the driver fabricated according to the embodiment of the present invention does not include the pulse signal generator in every channel but it has a structure where the common pulse signal generator 330 is shared by all channels. Therefore, it is possible to remarkably reduce the chip area of a digital-to-analog converter and a driver.

Figure 4:
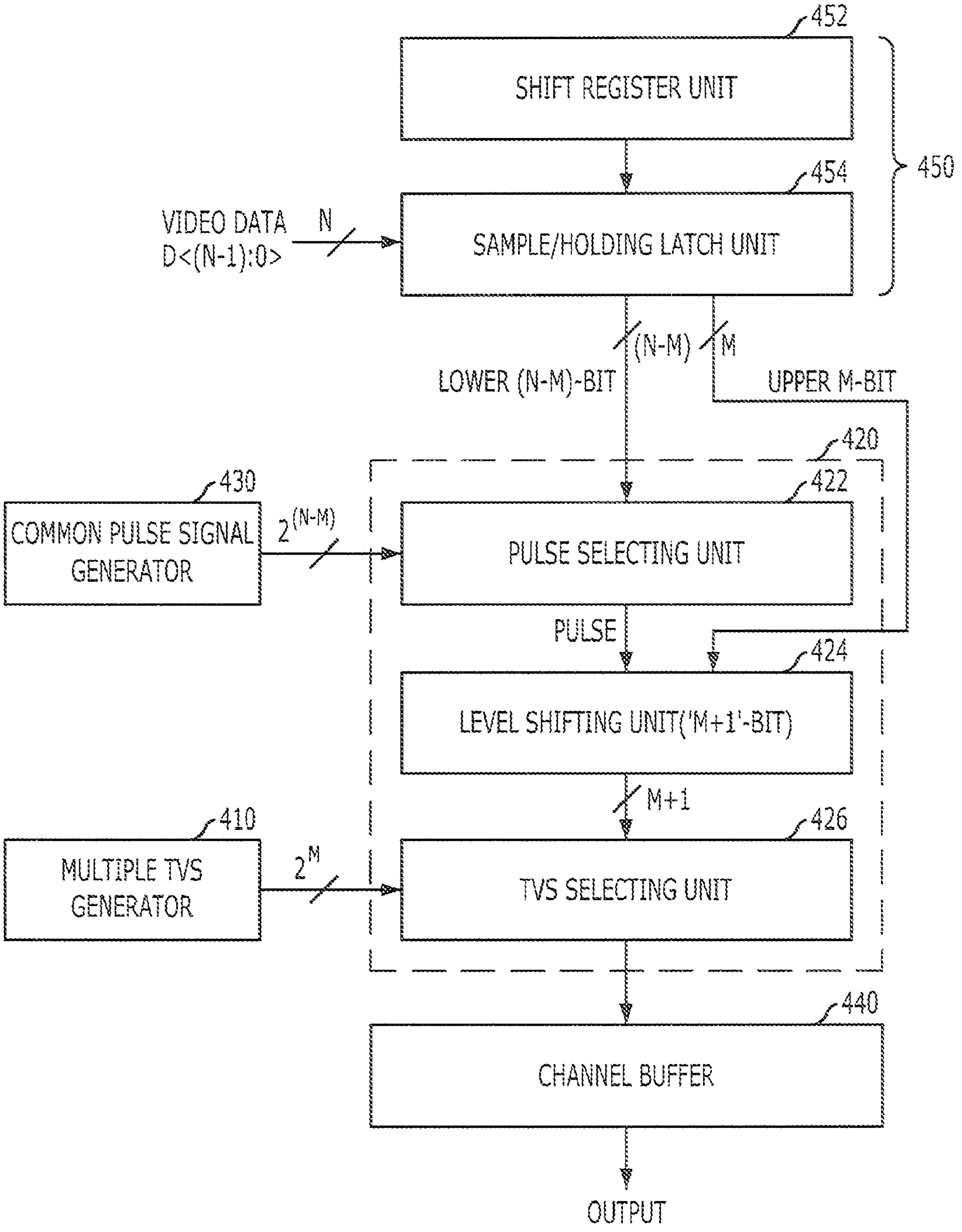
FIG. 4 is a detailed block diagram illustrating a unit channel block to which the driver of FIG. 3 is applied.

FIG. 4 is a detailed block diagram illustrating a unit channel block to which the driver of FIG. 3 is applied.

Referring to FIG. 4, the driver includes a sampler 450, a multiple TVS generator 410, a common pulse signal generator 430, a selector 420, and a channel buffer 440.

The sampler 450 performs sampling onto N-bit video data D<(N−1):0>. The multiple TVS generator 410 generates a plurality ($2^M$) of time variant signals. The common pulse signal generator 430 generates a plurality ($2^{N-M}$) of pulse signals having different pulse widths. The selector 420 receives the plurality ($2^M$) of the time variant signals, the plurality ($2^{N-M}$) of the pulse signals, and the sampled video data, selects any one among the plurality of the time variant signals, and outputs the selected time variant signal. The channel buffer 440 outputs an output of the selector 420 to a source line of the display panel.

The sampler 450, the selector 420, and the channel buffer 440 constituent elements of a unit channel block and they are provided to every channel that constitutes the driver. The multiple TVS generator 410 and the common pulse signal generator 430 are shared by all channels.

The selector 420 includes a pulse selecting unit 422, a level shifting unit 424, and a TVS selecting unit 426. The pulse selecting unit 422 selects one among the $2^{N-M}$ pulse signals based on the lower (N-M) bits of the sampled video data. The level shifting unit 424 level-shifts the upper M bits of the sampled video data and an output pulse signal of the pulse selecting unit 422. The TVS selecting unit 426 selects any one among the $2^M$ time variant signals based on the output of the level shifting unit 424. Herein, N and M are positive integers and N is greater than M (N>M).

The sampler 450 includes a shift register unit 452 and a sample/holding latch unit 454. Since circuit configurations of the shift register unit 452 and the sample/holding latch unit 454 are well known, their detailed description will be omitted for conciseness.

Figure 5:
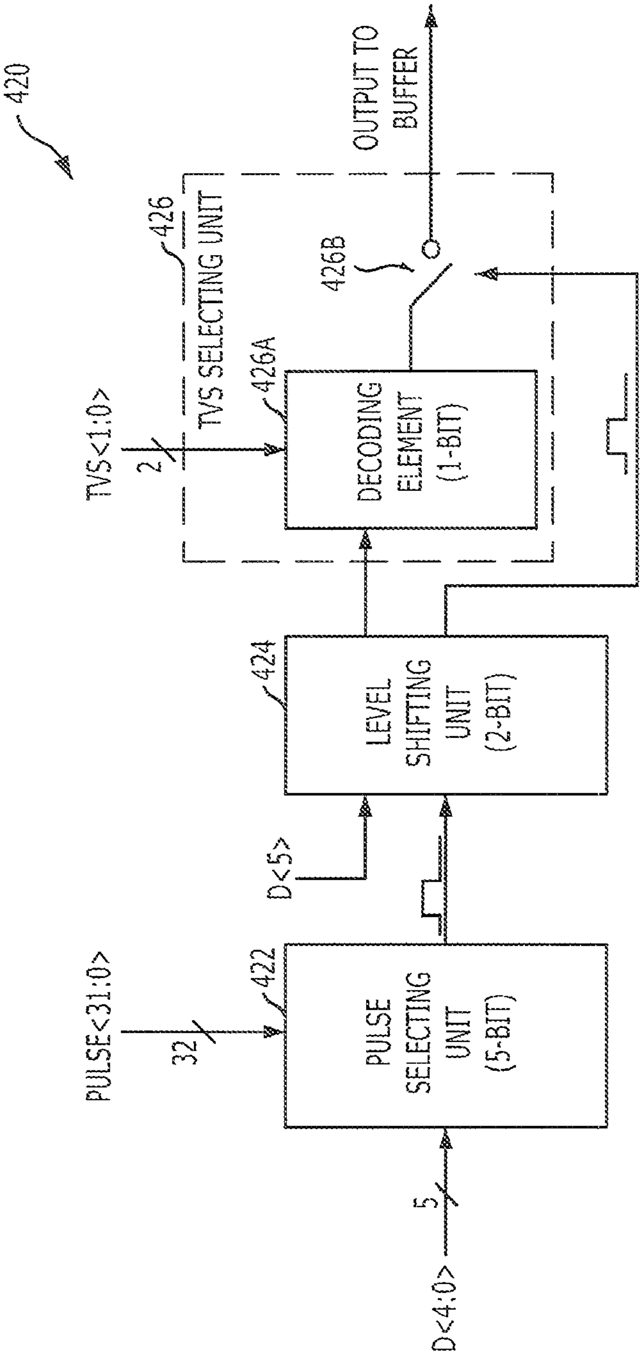
FIG. 5 is a detailed block diagram illustrating a selector shown in FIG. 3.

FIG. 5 is a detailed block diagram illustrating the selector 420. In this embodiment, the driver uses two time variant signals, and the driver is a 6-bit digital-to-analog converter. That is, it is assumed that the integer N is 6, and the integer M is 1.

The pulse selecting unit 422 may be formed to be a 5-bit decoder which receives the lower 5-bit data D<4:0> among the sampled video data D<5:0>, selects one among 32 pulse signals <31:0>, and outputs the selected pulse signal.

The TVS selecting unit 426 includes a 1-bit decoding element 426A and a switching element 426B. The 1-bit decoding element 426A selects one between two time variant signals TVS<0> and TVS<1> based on the upper 1-bit data D<5> obtained from the level shifting unit 424. The switching element 426B performs switching only in an enable (which becomes a logic high level) duration of a pulse signal obtained from the level shifting unit 424 and transfers the output of the 1-bit decoding element 426A to the channel buffer 440.

After all, since the entire grayscale voltages are equally divided, into two grayscale voltage regions and one between two time variant signals TVS<0> and TVS<1> which respectively represent the two grayscale voltage regions is selected, a preferred grayscale voltage region is selected and a target grayscale voltage is selected based on the pulse width of the pulse signal.

As described above, a digital-to-analog converting method according to one embodiment of the present invention includes selecting any one among a plurality of pulse signals based on a lower bit of sampled video data, selecting any one among a plurality of time variant signals based on an upper bit of the sampled video data, and transferring the selected time variant signal to a channel buffer by performing switching onto the selected time variant signal in an enable duration of the selected pulse signal. Herein, all grayscale voltages are equally divided into $\frac{1}{2}^M$ grayscale voltage regions for every period of one line time and the plurality ($2^M$) of the time variant signals are generated corresponding to the grayscale voltage ranges. The plurality of the pulse signals are multiple ($2^{N-M}$) pulse signals with different enable durations within a period of one line time (which are pulse widths).

Figure 6:
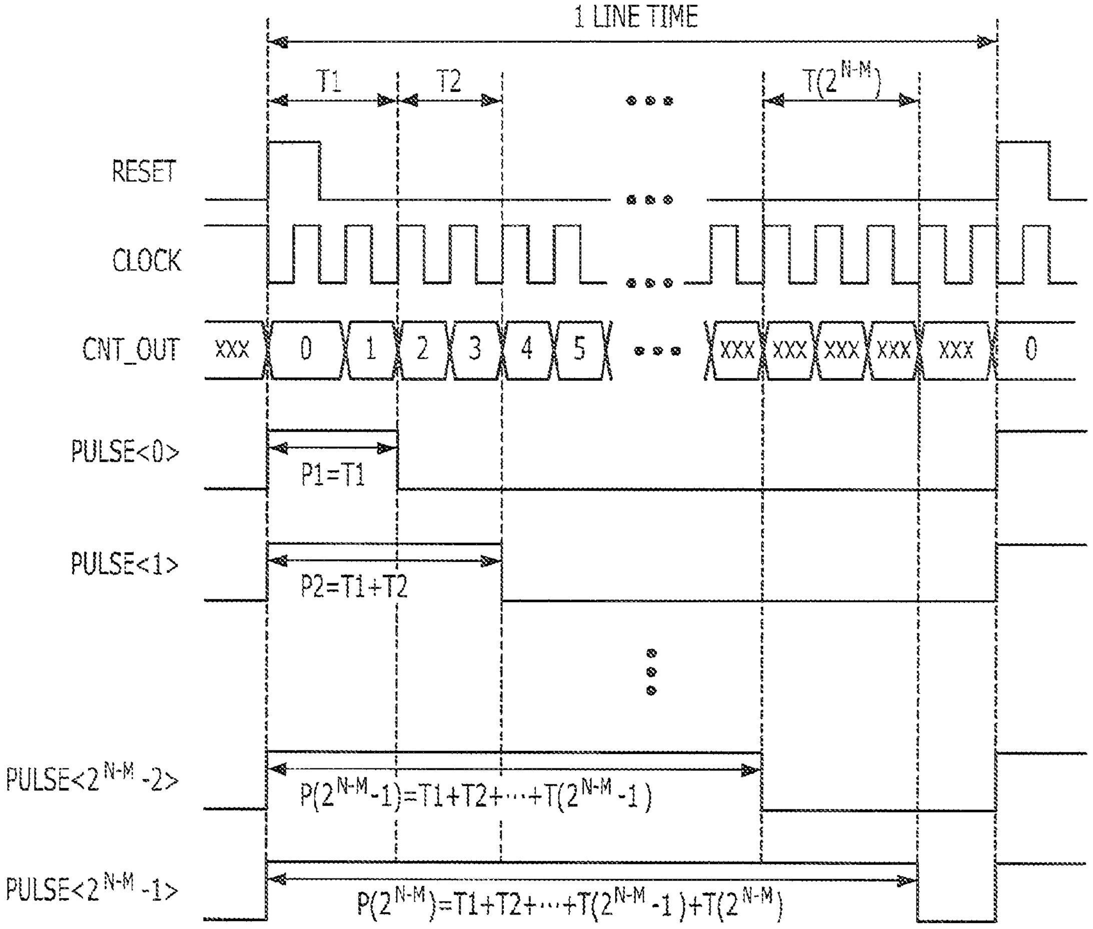
FIG. 6 is a timing diagram showing an on/off duty ratio of a common pulse signal in accordance with an embodiment of the present invention.

FIG. 6 is a timing diagram showing an on/off duty ratio of a common pulse signal PULSE <($2^{N-M}$−1):0> in accordance with embodiment of the present invention.

A period of one line time is divided into a plurality of durations T1 to T($2^{N-M}$), and each duration is time that a corresponding grayscale voltage arrives. In the embodiment show FIG. 6, each pulse signal is a signal that is enabled (which becomes a logic high level) from the initial moment to a moment when the corresponding grayscale voltage is reached.

A digital-to-analog converter using a time variant signal requires a longer charge time in the initial duration T1 of the one line time than in other durations of the one line time because voltage of a great width is required in the initial duration T1. Also, after the initial T1, sufficient charge time for the channel buffer operating the display panel is needed. When the charge time is not long enough, offset occurs and thus video quality may be deteriorated. To prevent the video quality from being deteriorated, a pulse signal generator of a driver fabricated according to one embodiment of the present invention can set up time separately for each duration T1 to T($2^{N-M}$).

Herein, the voltage variation rate according to the time of a time variant signal is interlocked with the durations T1 to T($2^{N-M}$) and changed based on the durations T1 to T($2^{N-M}$). Through this method, a problem of video quality may be solved.

Figure 7:
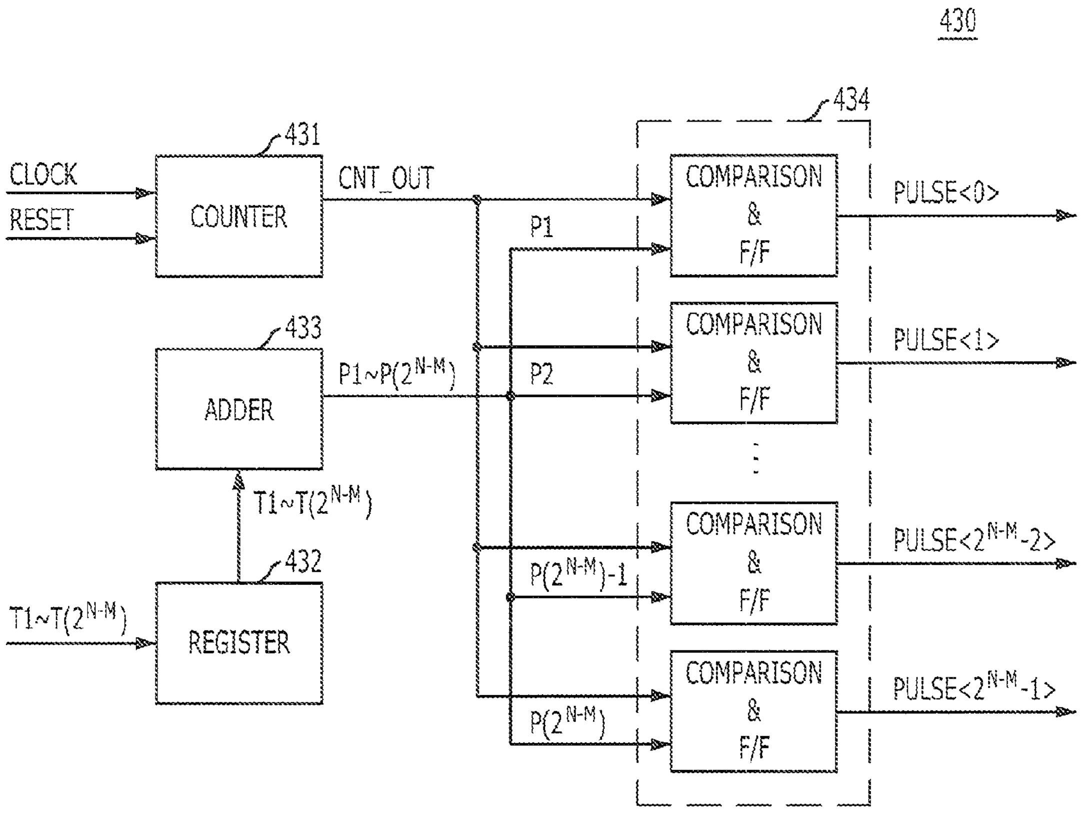
FIG. 7 is a detailed block diagram illustrating a common pulse signal genera or shown in FIG. 3.

FIG. 7 is a detailed block diagram illustrating the common pulse signal generator 430.

Referring to FIG. 7, the common pulse signal generator 430 includes a counter 431, a register 432, an adder 433, and a comparison & flip-flop unit 434.

The counter 431 outputs a counting signal CNT_OUT which increases in synchronization with a clock CLOCK, and is reset by a reset signal RESET at every period of one line time. The register 432 stores signals T1 to T($2^{N-M}$) having time information for all durations. The adder 433 receives the signals T1 to T($2^{N-M}$) from the register 432 and outputs values P1 to P($2^{N-M}$) that determine an on-duration, which is high-level duration, of a pulse signal. A comparator included in the comparison & flip-flop unit 434 generates a flag signal when any one of the values P1 to P($2^{N-M}$) is the same as the counting signal CNT_OUT, and the flag signal is transferred to a flip-flop F/F. The flip-flop F/F enables a pulse signal when the counting signal CNT_OUT becomes '0', and when a flag signal is generated, it disable the pulse signal. Accordingly, a pulse signal PULSE <($2^{N-M}$−1):0> is generated, and the on/off duty ratio of the pulse signal PULSE <($2^{N-M}$−1):0> is controlled.

Second Embodiment

The first embodiment described above describes a case where a plurality of time variant signals are used. Hereafter, a second embodiment using a single time variant signal will be described. The second embodiment to be described hereafter uses a common pulse signal generator, just as in the first embodiment. The common pulse signal generator includes a register for controlling the on/off duty ratio of a pulse signal.

Figure 8:
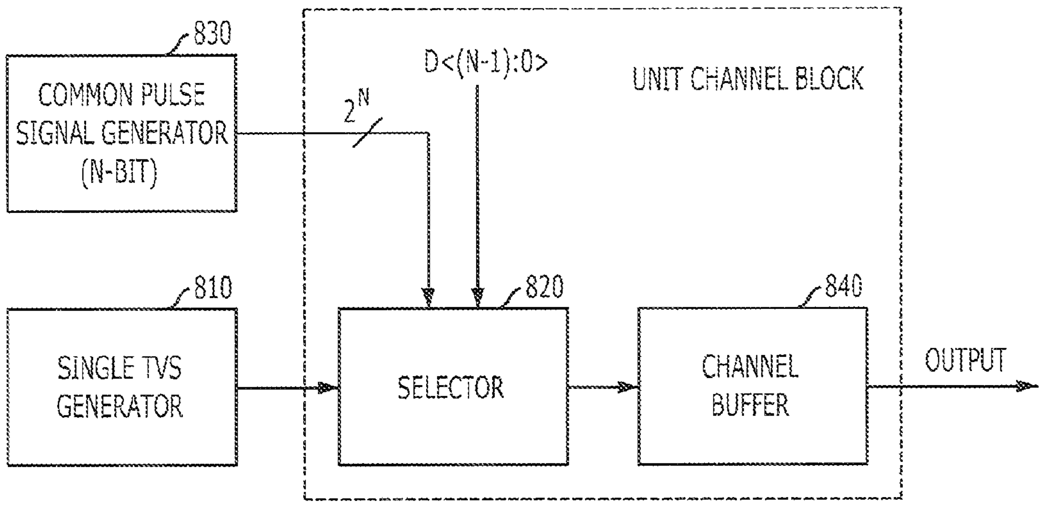
FIG. 8 is a block diagram illustrating a driver using a single TVS generator and a common pulse signal generator in accordance with a second embodiment of the present invention.

FIG. 8 is a block diagram illustrating a driver using a single TVS generator and a common pulse signal generator in accordance with a second embodiment of the present invention.

Referring to FIG. 8, the driver includes a single TVS generator 810, a common pulse signal generator 830, a selector 820, and a channel buffer 840. The single TVS generator 810 generates a single time variant signal. The common pulse signal generator 830 generates a plurality ($2^N$) pulse signals having different pulse, widths. The selector 820 receives the single time variant signal, the plurality of the pulse signals, and video data D<(N−1):0>, and selects a grayscale voltage corresponding to the video data. The channel buffer 840 outputs an output of the selector 820 to a source line of a display panel. Herein, N is a positive integer. The single time variant signal is generated corresponding to all grayscale voltages for a period of one line time.

The selector 820 and the channel buffer 840 are internal constituent elements of a unit channel block, and they are provided to each channel constituting the driver. The single TVS generator 810 and the common pulse signal generator 830 are shared by each channel.

Figure 9:
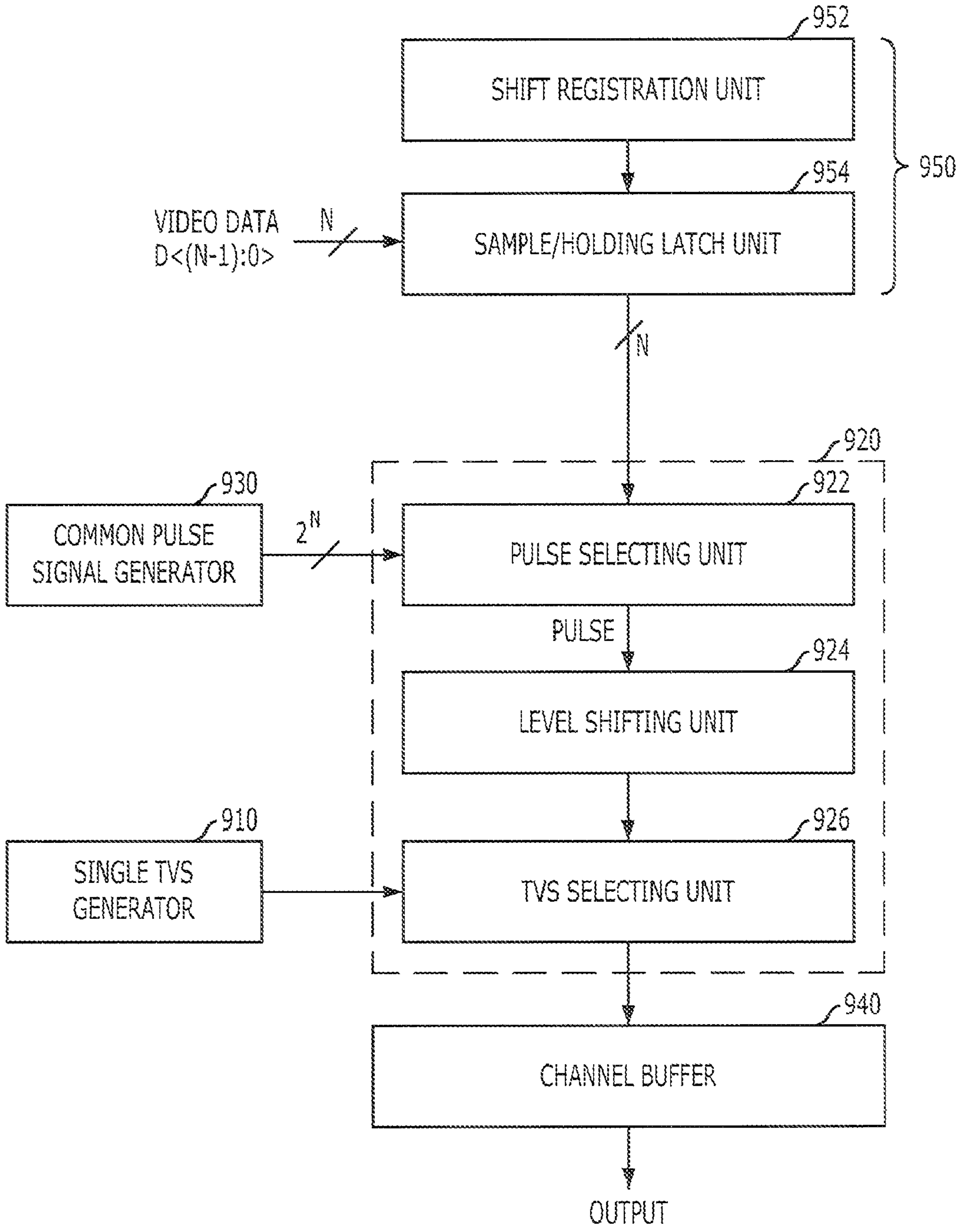
FIG. 9 is a detailed block diagram illustrating a unit channel block to which the driver of FIG. 8 is applied.

FIG. 9 is a detailed block diagram illustrating a unit channel block to which the driver of FIG. 8 is applied.

Referring to FIG. 9, the driver includes a sampler 950, a single TVS generator 910, a common pulse signal generator 930, a selector 920, and a channel buffer 940. The sampler 950 performs sampling onto N-bit video data D<(N−1):0>. The single. TVS generator 910 generates a single time variant signal. The common pulse signal generator 930 generates a plurality ($2^N$) of pulse signals having different pulse widths. The selector 920 receives the single time variant signal, the plurality of the pulse signals, and the sampled video data, and selects and outputs a grayscale voltage represented by the time variant signal. The channel buffer 940 outputs an output of the selector 920 to a source line of a display panel.

The sampler 950, the selector 920 and the channel buffer 940 are internal constituent elements of a unit channel block, and they are provided to each channel constituting the driver. The single TVS generator 910 and the common pulse signal generator 930 are shared by each channel.

The selector 920 includes a pulse selecting unit 922, a level shifting unit 924, and a TVS selecting unit 926. The pulse selecting unit 922 selects one among the plurality ($2^N$) of the pulse signals based on the sampled video data. The level shifting unit 924 level-shifts an output signal of the pulse selecting unit 922, which is the selected pulse signal. The TVS selecting unit 926 selects a target grayscale voltage from the single time variant signal based on the output of the level shifting unit 924.

The sampler 950 includes a shift register unit 952 and a sample/holding latch unit 954.

Figure 10:
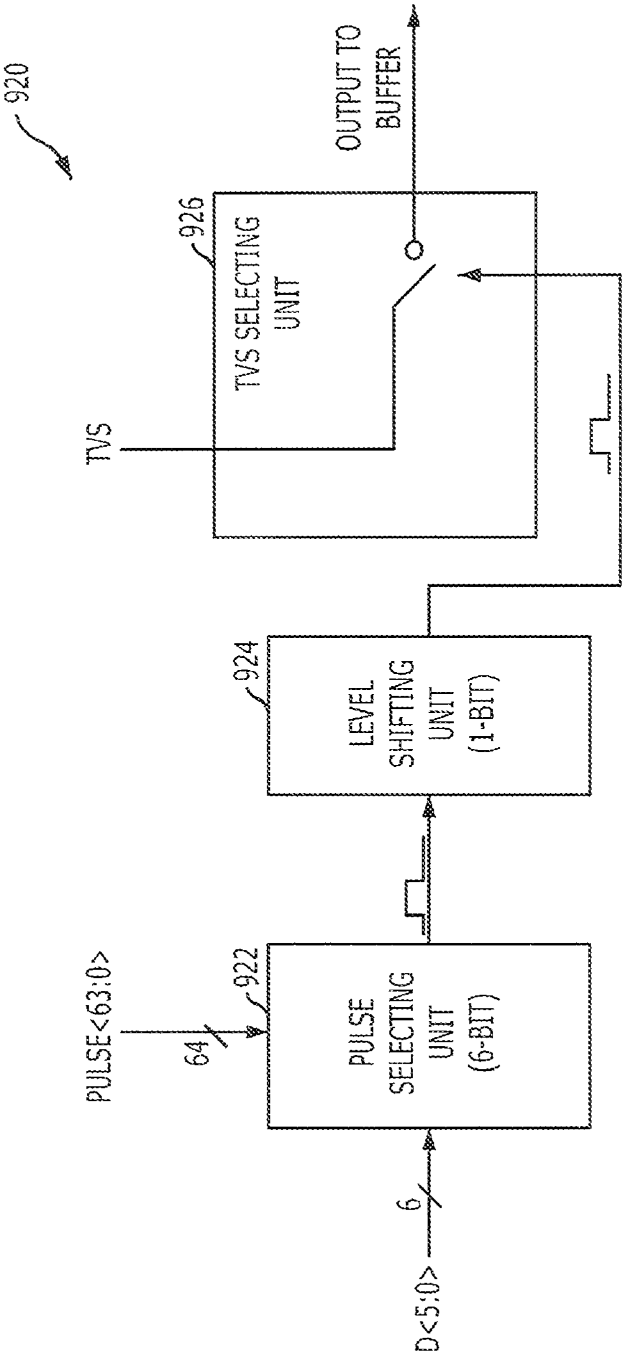
FIG. 10 is a detailed block diagram illustrating a selector shown in FIG. 9.

FIG. 10 is a detailed block diagram illustrating the selector 920 shown in FIG. 9. In this embodiment, the driver is a 6-bit digital-to-analog converter. That is, it is assumed that the integer N is 6.

Referring to FIG. 10, the pulse selecting unit 922 receives sampled 6-bit video data D<5:0> and selects and outputs one among $2^6$ pulse signals <63:0>. Thus, the pulse selecting unit 922 may be formed as a 6-bit decoder.

The TVS selecting unit 926 may be formed as a switch that performs switching onto the time variant signal only in an enable (which becomes a logic high level) duration of the selected pulse signal obtained from the level shifting unit 924 and transfers the time variant signal to the channel buffer 940. In other words, the output of the switch selects a target gray-scale value according to a pulse width of the selected pulse signal.

Herein, the common pulse signal generator 830 or 930 described in the second embodiment of the present invention may be formed to be able to control the on/off duty ratio of the pulse signal. In short, the common pulse signal generator includes a register to set up time for each duration of one line time and acquires charge time in and after the initial duration.

As described above, a digital-to-analog conversion method according to the second embodiment of the present invention includes selecting any one among a plurality of pulse signals based on sampled video data and switching a single time variant signal in an enable duration of the selected pulse signal and transferring the single time variant signal to a channel buffer. Herein, the plurality of the pulse signals are multiple pulse ($2^{N-M}$) signals whose enable duration (which is a pulse width) within a period of one line time is different.

Third Embodiment

In the first and second embodiments described before, a target grayscale voltage is determined based on a time variant signal, which has a voltage value, and the width of a pulse signal. In the third embodiment to be described hereafter, however, the target grayscale voltage is determined based on a time variant signal, which has a current value, and the width of a pulse signal, and all the other constituent elements and operations are the same.

Figure 11A:
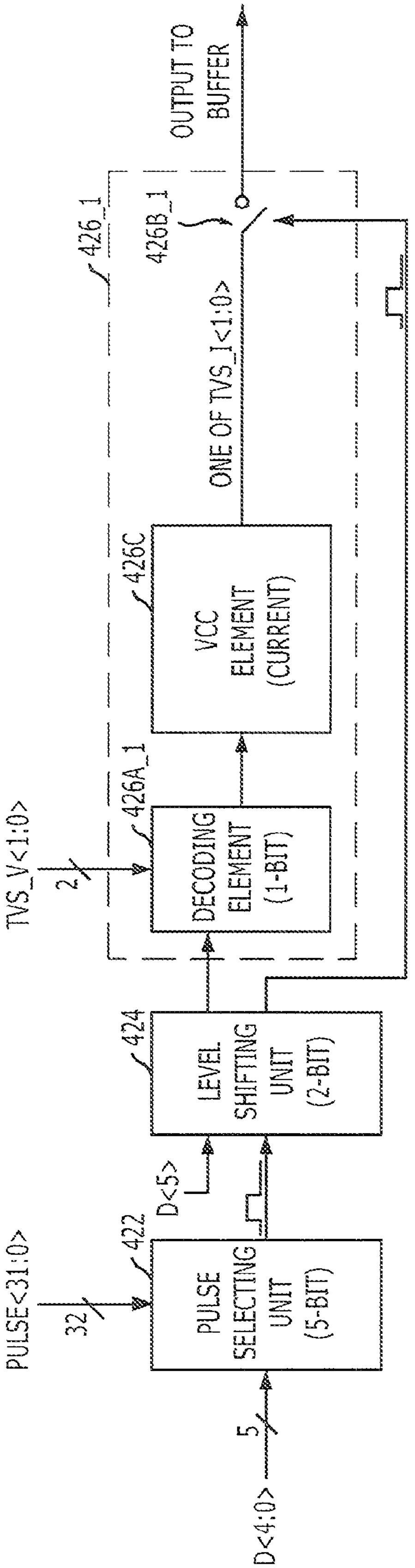
FIGS. 11A and 11B are block diagrams illustrating a modification example of the selector of the driver shown in FIGS. 5 and 10, respectively, in accordance with a third embodiment of the present invention.

FIG. 11A is a block diagram illustrating a modified example of the selector of the driver shown in FIG. 5.

Referring to FIG. 11A, a TVS selecting unit 426_1 includes a 1-bit decoding element 426A_1, a voltage-to-current converting (VCC) element 426C, and a switching element 426B_1.

The 1-hit decoding element 426A_1 selects and outputs one between two voltage time variant signals TVS_V<0> and TVS_V<1> based on an upper 1-bit data D<5> obtained from the level shifting unit 424. The voltage-to-current converting element 426C generates a current-level time variant signal TVS_I<0> or TVS_I<1> from a voltage-level time variant signal TVS_V<0> or TVS_<1>, which is an output of the 1-bit decoding element 426A_1. The switching element 426B_1 switches the output of the voltage-to-current converting element 426C only in an enable (which becomes a logic high lever) duration of the selected nuke signal obtained from the level shifting unit 424 and transfers the output of the voltage-to-current converting element 426C to the channel buffer. The other constituent elements and their operations are substantially the same, as the corresponding constituent elements illustrated in FIG. 5.

Herein, the input voltage of the channel buffer increases up to a target voltage based on the strength of current and the pulse width of the pulse signal.

The digital-to-analog conversion method according to the embodiment of the present invention described in FIG. 11A includes selecting any one among a plurality of pulse signals based on a lower bit among sampled video data, selecting any one among a plurality of voltage time variant signals based on an upper bit among the sampled video data, converting the selected voltage time variant signal into a current time variant signal, and switching the current time variant signal in an enable duration of the selected pulse signal and transferring the current time variant signal to a channel buffer.

Figure 11B:
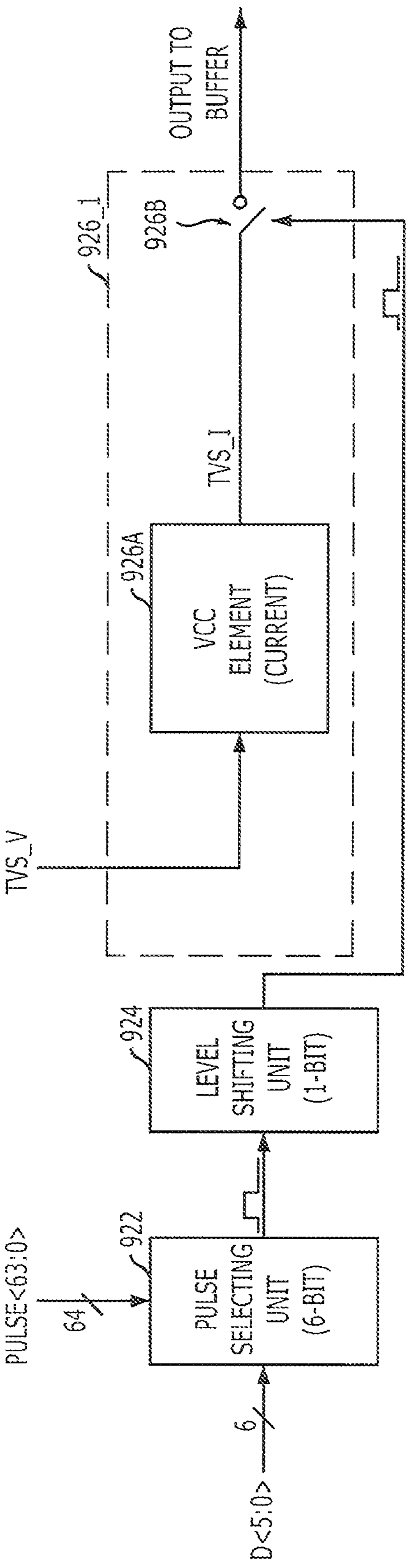

FIG. 11B is a block diagram illustrating a modified example of the selector of the driver shown in FIG. 10.

Referring to FIG. 11B, a TVS selecting unit 9261 includes a voltage-to-current converting (VCC) element 926A and a switching element 926B. The voltage-to-current converting element 926A generates a current-level time variant signal TVS_I from a voltage-level single time variant signal TVS_V. The switching element 926B switches the output of the voltage-to-current converting element 926A only in an enable (which becomes a logic high level) duration of the selected pulse signal obtained from the level shifting trait 924 and transfers the output of the voltage-to-current converting element 926A to the channel buffer. The other constituent elements and their operations are substantially the same as the corresponding constituent elements shown in FIG. 10.

The digital-to-analog converting method according to the embodiment of FIG. 11B includes selecting any one among a plurality of pulse signals based on sampled video data, converting a single voltage time variant signal into a current time variant signal, and switching the current time variant signal in the enable duration of the selected pulse signal and transferring the current time variant signal to the channel buffer.

Fourth Embodiment

Figure 12:
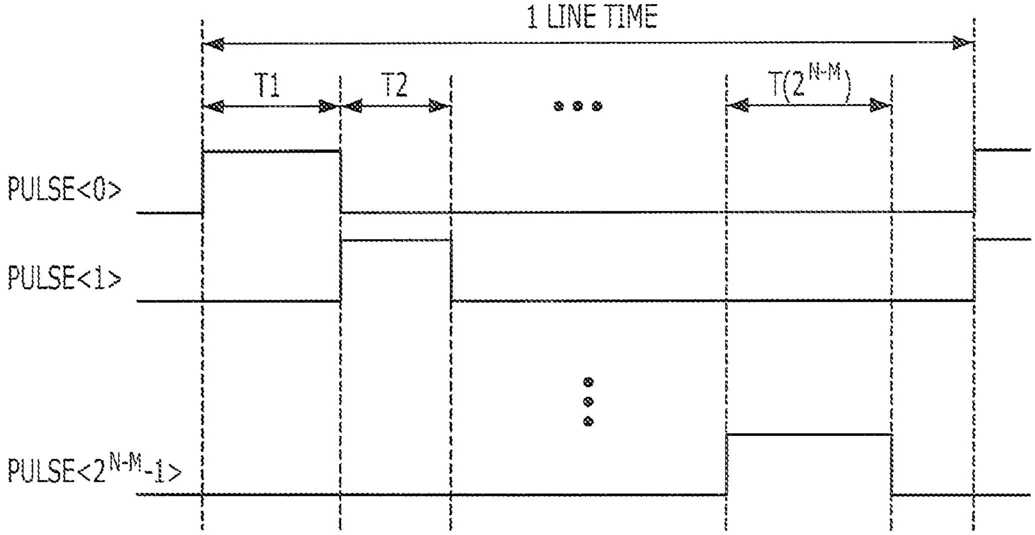
FIG. 12 is a waveform of a pulse signal in accordance with a fourth embodiment of the present invention.

FIG. 12 is a waveform of a pulse signal that may be applied to the first to third embodiments in accordance with a fourth embodiment of the present invention.

Referring to FIG. 12, the drawing shows that when a common pulse signal generator generates a plurality of pulse signals PULSE <($2^{N-M}$−1):0>, the high duration of each pulse signal is not overlapped with the high durations of other pulse signals. In other words, the pulse signals may be formed to be enabled in the respective durations T1 to T($2^{N-M}$) of one line time. Differently from the pulse signal illustrated in FIG. 6, a pulse signal may be formed to be enabled only in a particular duration where a corresponding grayscale voltage arrives.

According to the technology of the present invention, a pulse signal generator is not provided to every channel and all channels use one pulse signal generator in common. Therefore, it is possible to reduce the area and power consumption for pulse signal generators. In general, it is the digital-to-analog converter that occupies most of the area and power consumption in a data driver.

Also, according to the technology of the present invention, an on/off duty ratio may be controlled. A charge time may be appropriately determined for each duration based on the on/off duty ratio, and a problem of deteriorated video quality caused by a shortage of the charge time may be resolved.

While the present invention has been described with respect to the specific embodiments, it will be apparent to those skilled in the art that various changes and modifications may be made without departing from the spirit and scope of the invention as defined in the following claims.

What is claimed is:

1. An apparatus for driving a display panel, comprising:

a time variant signal (TVS) generator configured to generate at least one time variant signal;

a common pulse signal generator configured to generate at least one pulse signal;

a selector configured to receive the at least one time variant signal, the at least one pulse signal, and video data and select a grayscale voltage corresponding to the video data; and a buffer configured to buffer and transfer an output of the selector, wherein the selector and the buffer are provided to each of a plurality of channels, and the time variant signal and the plurality of the pulse signals are inputted in common to the selector of the plurality of channels.

2. The apparatus of claim 1, wherein the TVS generator divides a range of all grayscale voltages into a plurality of grayscale voltage ranges and generates a time variant signal group having a plurality of time variant signals each corresponding to one of the grayscale voltage ranges, respectively.

3. The apparatus of claim 1, wherein the TVS generator generates a single time variant signal sequentially representing a range of all grayscale voltages.

4. The apparatus of claim 1, wherein the common pulse signal generator includes a register configured to control a state of each pulse signal.

5. An apparatus for driving a display panel, comprising:

a time variant signal (TVS) generator configured to generate a plurality of time variant signals;

a common pulse signal generator configured to generate a plurality of pulse signals;

a sampler configured to sample and output video data;

a pulse selector configured to select any one among the plurality of the pulse signals based on a lower-bit data among the sampled video data; and a TVS selector configured to select any one among the plurality of the time variant signals based on an upper-bit data among the sampled video data, switch the selected time variant signal based on the selected pulse signal, and transfer the switched time variant signal.

6. The apparatus of claim 5, wherein the sampler, the pulse selector, and the TVS selector are provided to each of a plurality of channels, and the TVS generator and the common pulse signal generator are formed to be shared by the plurality of the channels.

7. The apparatus of claim 5, further comprising:

a level shifter configured to shift a voltage level of the upper-bit data among the sampled video data and a voltage level of the selected pulse signal, and transfer the shifted voltage level of the upper-bit data and the shifted voltage level of the selected pulse signal to the TVS selector.

8. The apparatus of claim 5, wherein the plurality of the pulse signals are voltage-level signals, and the TVS selector further comprises a voltage-to-current converting (VCC) unit configured to convert the selected time variant signal from a voltage level to a current level.

9. The apparatus of claim 5, wherein the pulse signal is a signal enabled from an initial moment to a moment when a corresponding grayscale voltage is reached, or a signal enabled in a particular duration where the corresponding grayscale voltage is reached.

10. The apparatus of claim 5, wherein the common pulse signal generator comprises a register configured to control an on/off duty ratio of each pulse signal.

11. An apparatus for driving a display panel, comprising:

a time variant signal (TVS) generator configured to generate a single time variant signal;

a common pulse signal generator configured to generate a plurality of pulse signals;

a sampler configured to sample and output video data;

a pulse selector configured to select any one among the plurality of the pulse signals based on the sampled video data; and a switch configured to switch the time variant signal based on the selected pulse signal and transfer the switched time variant signal.

12. The apparatus of claim 11, wherein the sampler, the pulse selector, and the switch are provided to each of a plurality of channels, and the TVS generator and the common pulse signal generator are formed to be shared by the plurality of the channels.

13. The apparatus of claim 11, further comprising:

a level shifter configured to shift a voltage level of the selected pulse signal and transfer the shifted voltage level of the selected pulse signal to the switch.

14. The apparatus of claim 11, wherein the single pulse signal is a voltage-level signal, and the TVS selector further comprises a voltage-to-current converting (VCC) unit for converting the selected time variant signal from a voltage level to a current level.

15. The apparatus of claim 11, wherein the pulse signal is a signal enabled from an initial moment to a moment when a corresponding grayscale voltage is reached, or a signal enabled in a particular duration where the corresponding grayscale voltage is reached.

16. The apparatus of claim 11, wherein the common pulse signal generator comprises a register configured to control a state of each pulse signal.

17. A digital-to-analog converting method, comprising:

selecting any one among a plurality of pulse signals based on a lower-bit data among sampled video data;

selecting any one among a plurality of time variant signals based on an upper-bit data among the sampled video data; and switching the selected time variant signal based on the selected pulse signal and transferring the switched time variant signal by using a switching element.

18. The method of claim 17, further comprising:

shifting a voltage level of the selected pulse signal.

19. The method of claim 17, further comprising:

controlling a state of each pulse signal.

20. The method of claim 17, further comprising:

converting the selected time variant signal from a voltage level to a current level.

21. The method of claim 17, wherein the pulse signal is a signal enabled from an initial moment to a moment when a corresponding grayscale voltage is reached, or a signal enabled in a particular duration where the corresponding grayscale voltage is reached.

22. A digital-to-analog converting method, comprising:

selecting any one among a plurality of pulse signals based on sampled video data; and switching a single time variant signal in an enable duration of the selected pulse signal and transferring the switched time variant signal to a channel buffer.

23. The method of claim 22, further comprising:

shifting a voltage level of the selected pulse signal.

24. The method of claim 22, further comprising:

controlling a state of each pulse signal.

25. The method of claim 22, further comprising:

converting the single time variant signal from a voltage level to a current level.

26. The method of claim 22, wherein the pulse signal is a signal enabled from an initial moment to a moment when a corresponding grayscale voltage is reached, or a signal enabled in a particular duration where the corresponding grayscale voltage is reached.

27. The method of claim 17, wherein the switch element performs the switching of the selected time variant signal during an enable duration of the selected pulse signal.

28. The method of claim 22, wherein the switching of the single time variant signal is performed using a switching element.

* * * * *